(12) United States Patent
Liu et al.

(10) Patent No.: US 10,536,064 B2
(45) Date of Patent: Jan. 14, 2020

(54) LINEAR VIBRATION MOTOR

(71) Applicant: Goertek, Inc., Weifang, Shandong (CN)

(72) Inventors: Baoyu Liu, Weifang (CN); Yueguang Zhu, Weifang (CN)

(73) Assignee: GOERTEK, INC., Weifang, Shandong (CN)

( * ) Notice: Subject to any disclaimer, the term of this patent is extended or adjusted under 35 U.S.C. 154(b) by 0 days.

(21) Appl. No.: 15/573,258

(22) PCT Filed: Dec. 19, 2016

(86) PCT No.: PCT/CN2016/110770
§ 371 (c)(1),
(2) Date: Nov. 10, 2017

(87) PCT Pub. No.: WO2018/036037
PCT Pub. Date: Mar. 1, 2018

(65) Prior Publication Data
US 2019/0222106 A1     Jul. 18, 2019

(30) Foreign Application Priority Data
Aug. 24, 2016 (CN) .......................... 2016 1 0717686

(51) Int. Cl.
*H02K 33/06* (2006.01)
*H02K 33/02* (2006.01)
*H02K 33/16* (2006.01)

(52) U.S. Cl.
CPC ............. *H02K 33/06* (2013.01); *H02K 33/02* (2013.01); *H02K 33/16* (2013.01)

(58) Field of Classification Search
CPC ......... H02K 33/00–33/18; H02K 35/00–35/06
USPC ...................................................... 310/15–39
See application file for complete search history.

(56) References Cited

U.S. PATENT DOCUMENTS

| 2009/0096299 A1* | 4/2009 | Ota ..................... B06B 1/045 310/25 |
| 2012/0112565 A1* | 5/2012 | Lee ..................... B06B 1/045 310/20 |
| 2016/0226365 A1* | 8/2016 | Wang .................... H02K 33/16 |

* cited by examiner

*Primary Examiner* — Thomas Truong
(74) *Attorney, Agent, or Firm* — Hultquist, PLLC; Steven J. Hultquist

(57) ABSTRACT

The present invention discloses a linear vibration motor. The linear vibration motor comprises: a stator assembly including a shell, a coil and a central support, wherein the shell is provided with a cavity therein and includes a shell wall in parallel to a direction of vibration, and the coil and the central support are located in the cavity, the coil being configured on the shell wall and the central support being configured in the intermediate portion of the shell wall to connect a resilient element; a vibrator assembly including a permanent magnet and a counterweight portion, the permanent magnet and the counterweight portion being connected together; and resilient elements, through which the vibrator assembly is suspended within the cavity, wherein the resilient elements comprise a first end and a second end arranged opposite to each other in the direction of vibration, the first end being connected to the central support and the second end being connected to the vibrator assembly.

11 Claims, 4 Drawing Sheets

LINEAR VIBRATION MOTOR

CROSS-REFERENCE TO RELATED APPLICATIONS

This application is a U.S. national phase under the provisions of 35 U.S.C. § 371 of International Patent Application No. PCT/CN2016/110770 filed Dec. 19, 2016, which in turn claims priority of Chinese Patent Application No. 201610717686.5 filed Aug. 24, 2016. The disclosures of such international patent application and Chinese priority patent application are hereby incorporated herein by reference in their respective entireties, for all purposes.

FIELD OF THE INVENTION

The present invention relates to the technical field of vibration motors, and in particular, to a linear vibration motor.

BACKGROUND OF THE INVENTION

A miniature linear vibration motor usually comprises a vibration assembly and a stator assembly. At present, most of the miniature linear vibration motors accomplish their reciprocating and periodic vibration through the vibration assembly. The vibration assembly accomplishes the reciprocating vibration through an elastic sheet or a spring.

Normally, the elastic sheet or the spring located at two ends of the vibration assembly is welded on the shell of the motor. The shape and size of the elastic sheet or spring are variously designed in consideration of the shape and size of the vibration motor and the performance of the vibration motor. However, since the elastic sheet or spring is mostly fixedly connected to the shell, an obvious polarization occurs during the vibration. Meanwhile, the polarization of the elastic sheet easily leads to the stress concentration and the plastic deformation of the elastic sheet, so that its effective life is significantly reduced. Besides, the collisions caused by polarization will generate abnormal noise and relatively obvious heat.

SUMMARY OF THE INVENTION

The present invention is directed to provide a novel technical solution of a linear vibration motor.

An embodiment of this disclosure provides a linear vibration motor, comprising: a stator assembly including a shell, a coil and a central support, wherein the shell is provided with a cavity therein and includes a shell wall in parallel to a direction of vibration, and the coil and central support are located within the cavity, the coil being disposed on the shell wall, and the central support being arranged in the middle of the shell wall and configured to connect a resilient element; a vibrator assembly including a permanent magnet and a counterweight portion, the permanent magnet and the counterweight portion being connected together; and the resilient element for providing resilient restoring force, through which the vibrator assembly are suspended in the cavity, wherein the resilient element includes a first end and a second end arranged opposite to each other in the direction of vibration, the first end being connected to the central support and the second end being connected to the vibrator assembly.

Optionally, the central support includes a first barrier wall and a second barrier wall disposed opposite to each other in the direction of vibration, the counterweight portion includes a surface adjacent to the central support, and further includes a first side wall and a second side wall protruding from the surface respectively, wherein the first side wall and the second side wall are arranged opposite to each other in the direction of vibration, the first side wall is connected to the first barrier wall through the resilient elements, and the second barrier wall is connected to the second side wall through the resilient element.

Optionally, the central support is U-shaped, and the U-shaped central support includes the first barrier wall and the second barrier wall arranged opposite to each other, and the counterweight portion is in an inverted U shape, and comprises the first side wall and the second wall arranged opposite to each other.

Optionally, the coil and the central support are arranged on one same shell wall, and the central support is disposed between the shell wall and the coil.

Optionally, the shell wall comprises the first shell wall and the second shell wall arranged opposite to each other, the coil is configured on the first shell wall and the central support is arranged on the second shell wall.

Optionally, the first barrier wall and the second barrier wall are positioned between the first side wall and the second side wall.

Optionally, the resilient element is a spring or an elastic sheet, wherein the elastic sheet comprises a first cantilever, a second cantilever and a bending portion located between the first cantilever and the second cantilever, the first cantilever, the second cantilever and the bending portion are connected together, the first cantilever is connected to the side wall, and the second cantilever is connected to the barrier wall.

Optionally, between the first side wall and the first barrier wall are arranged two elastic sheets which are symmetrically arranged, and between the second said wall and the second barrier wall are arranged another two elastic sheets which are symmetrically arranged.

Optionally, one lateral magnet is provided at each the outer sides of the two long edges of the coil, the two lateral magnets are arranged to be magnetized in the direction of vibration, and the lateral magnet has the same polarity as the adjacent intermediate magnet.

Optionally, the height of the lateral magnets is less than the height of the coil.

The inventors of the present invention have found that in the prior art, the resilient element is provided on the shell and is located at both ends of the vibrator assembly. Such a structure easily causes polarization during the vibration, and the polarization will reduce the life of resilient element and has large noise. Thus, the technical task to be accomplished or the technical problem to be solved by the present invention is never thought of or anticipated by those skilled in the art, and thereby the present invention is a novel technical solution.

The linear vibration motor has a central support. The central support is provided in the middle of the shell wall. The central support is configured to connect a resilient element. The resilient element is connected to the middle portion of the shell wall by the central support, rather than to the end of the shell in the direction of vibration. This arrangement can effectively reduce or even avoid polarization of the vibrator assembly during vibration.

Other features and advantages of the present invention will become apparent from the following detailed description of exemplary embodiments of the present invention with reference to the accompanying drawings.

BRIEF DESCRIPTION OF THE DRAWINGS

The accompanying drawings, which are incorporated in and constitute a part of the specification, illustrate embodiments of the invention and, together with the description thereof, serve to explain the principles of the invention.

Figure 1:
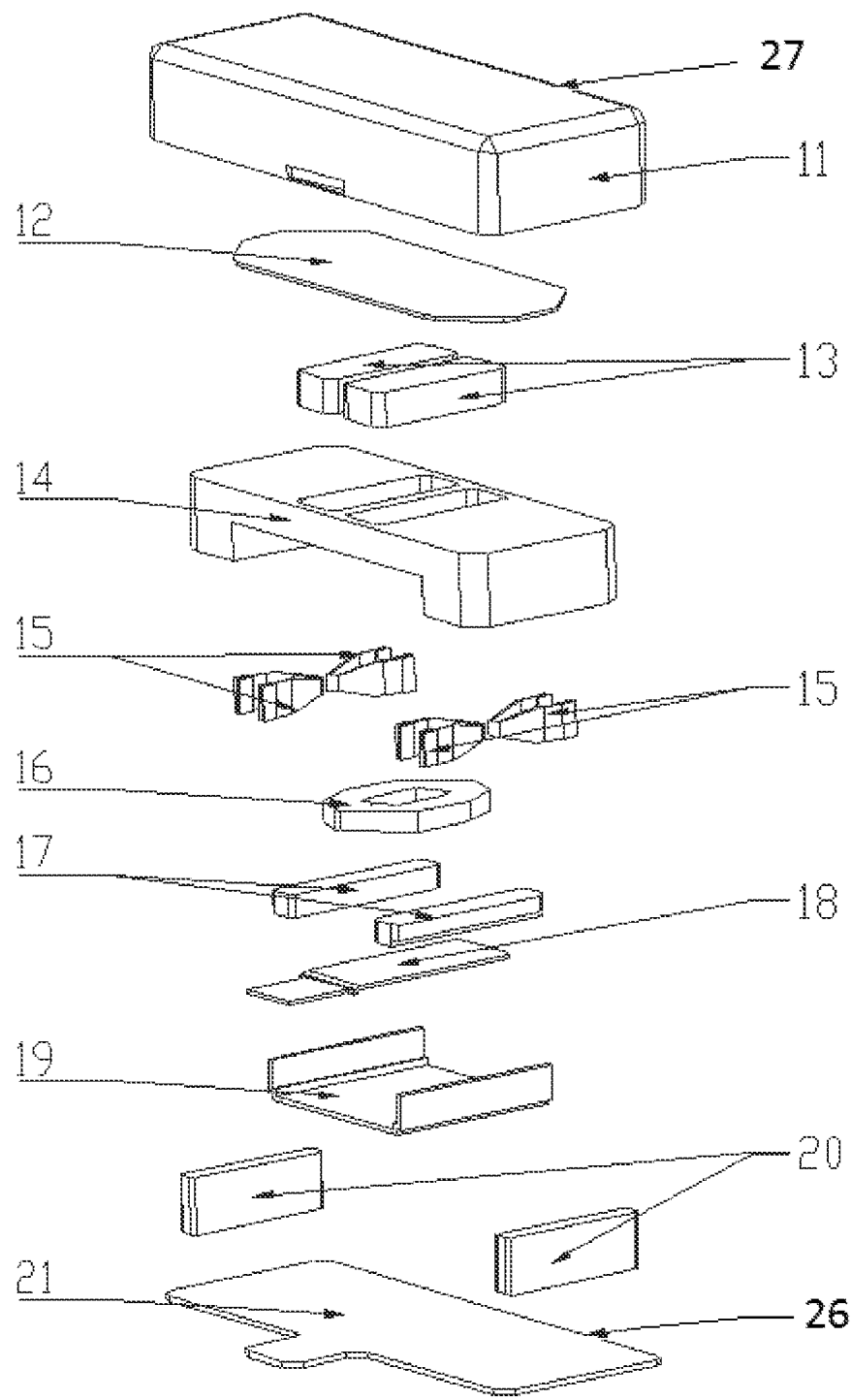
FIG. 1 is an exploded view of the linear vibration motor according to an embodiment of the present invention.

In the figures: 11—upper shell; 12—washer; 13—intermediate magnet; 14—tungsten steel block; 15—elastic sheet; 16—coil; 17—lateral magnet; 18—FPCB; 19—central support; 20—resilient pad; 21—lower shell; 22—first barrier wall; 23—second barrier wall; 24—first side wall; 25—second side wall; 26—first shell wall; 27—second shell wall.

DETAILED DESCRIPTION OF THE EMBODIMENTS

Various exemplary embodiments of the present invention will now be described in detail with reference to the accompanying drawings. It should be noted that the relative arrangement, numerical expressions and numerical values of the components and steps set forth in these examples do not limit the scope of the invention unless otherwise specified.

The following description of at least one exemplary embodiment is in fact merely illustrative and is in no way intended as a limitation to the present invention and its application or use.

Techniques, methods, and apparatus known to those of ordinary skill in the relevant art may not be discussed in detail but where appropriate, the techniques, methods, and apparatus should be considered as part of the description.

Among all the examples shown and discussed herein, any specific value should be construed as merely illustrative and not as a limitation. Thus, other examples of exemplary embodiments may have different values.

It should be noted that similar reference numerals and letters denote similar items in the accompanying drawings, and therefore, once an item is defined in a drawing, there is no need for further discussion in the subsequent accompanying drawings.

Figure 2:
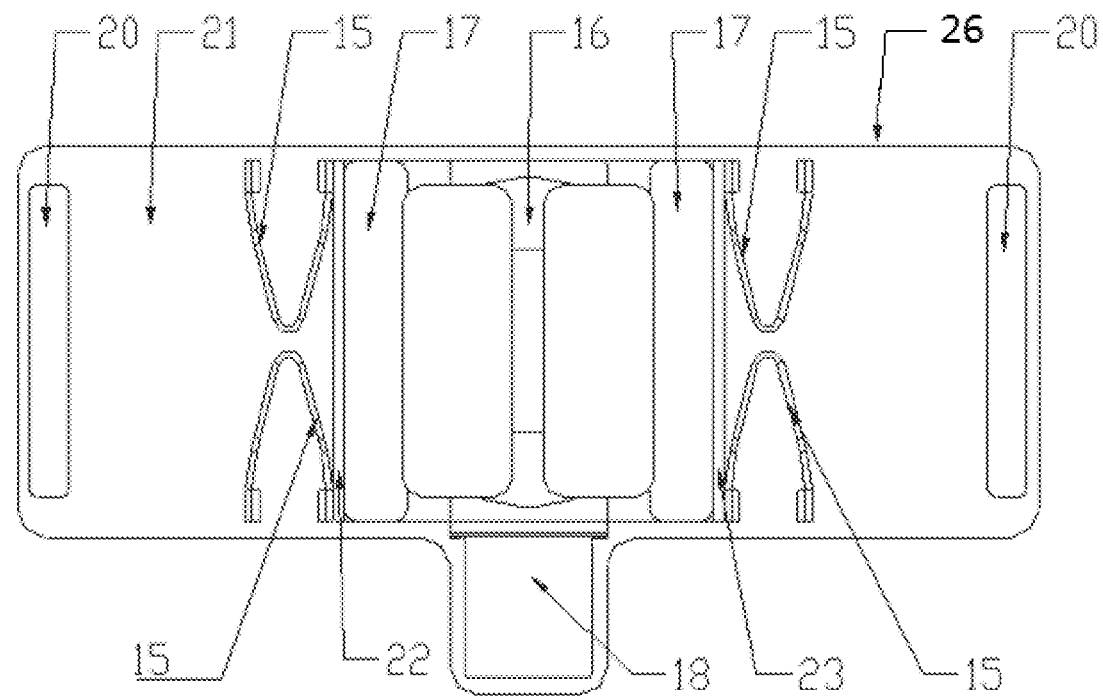
FIG. 2 is a schematic view of the structure of the linear vibration motor without an upper shell and a tungsten steel block according to an embodiment of the present invention.

The present invention provides a linear vibration motor. Referring to FIG. 1 and FIG. 2, the vibration motor includes: a stator assembly, a vibrator assembly and a resilient element. The stator assembly configured for providing the driving force comprises a shell, a coil 16 and a central support 19. The coil 16 forms an alternating magnetic field in response to the electrical signal of an external circuit. The alternating magnetic field interacts with the permanent magnet to form an electromagnetic force. The electromagnetic force is the driving force for the vibration of the vibrator system.

In the present invention, a cavity is provided in the shell. The shell includes a shell wall in parallel to the direction of vibration. For example, the shell is rectangular and includes four shell walls respectively parallel to the direction of vibration. Of course, the shape of the shell is not limited thereto, and may be circular, trapezoidal, or the like. The coil 16 and the central support 19 are located within the cavity. The coil 16 is provided on the shell wall. The central support 19 is provided in the middle of the shell wall. For example, both the coil 16 and the central support 19 are located in the middle of the shell wall, so that the vibration of the linear vibration motor can be made more balanced. The central support 19 is configured for connecting the resilient element.

In the present invention, the vibrator assembly includes a permanent magnet and a counterweight portion. The permanent magnet is configured for providing magnetic fields having uniform strength. The counterweight portion is configured to increase the mass of the vibrator assembly in order to increase the amplitude of the linear vibration motor. The permanent magnet and counterweight portion are connected together. The resilient element is used to provide elastic restoring force. The vibrator assembly is suspended in the cavity by means of the resilient element. The resilient element includes a first end and a second end disposed opposite to each in the direction of the vibration, wherein the first end is connected to the central support 19 and the second end is connected to the vibrator assembly. For example, the resilient element may be connected to the central support 19 or the counterweight by welding.

The linear vibration motor has a central support 19. The central support 19 is provided in the middle of the shell wall. The central support 19 is configured for connecting the resilient element. The resilient element is connected to the middle of the shell wall by the central support 19, rather than to the end of the shell in the direction of vibration. This arrangement can effectively reduce or even avoid polarization of the vibrator assembly during vibration.

In addition, since the polarization is reduced, the service life of the resilient element is effectively extended.

In addition, due to the reduction of the polarization, the collision generated by the vibration is reduced, thereby reducing the vibration noise and the heat generation during vibration.

In addition, the resilient element does not occupy the space in the longitudinal direction of the cavity, so that the counterweight portion can be made larger and the amplitude will be larger, so this structure is more suitable for low frequency linear vibration motor.

Figure 3:
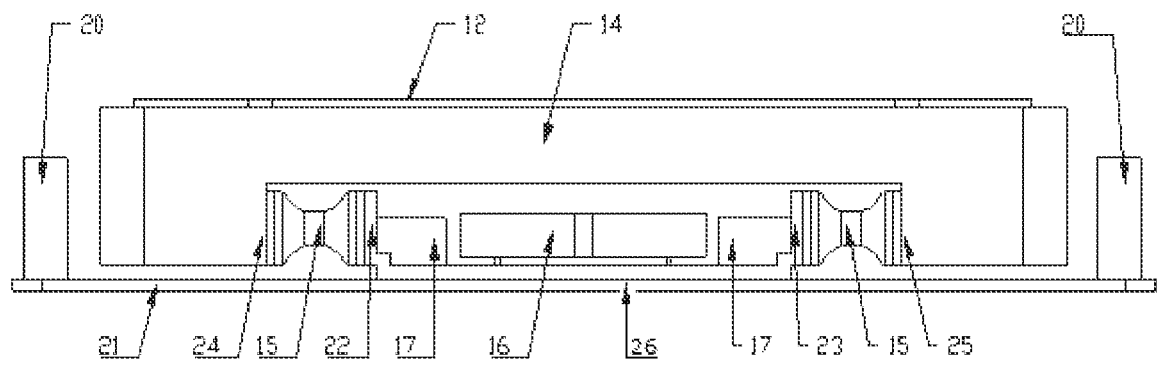
FIG. 3 is a side view of the linear vibration motor without an upper shell according to an embodiment of the present invention.

In a specific embodiment of the present invention, as shown in FIGS. 1-3, the shell includes the upper shell 11 and the lower shell 21 in order to facilitate the disassembly and installation of the linear vibration motor. The upper shell 11 and the lower shell 21 are connected together to form a cavity therein; for example, the shell is rectangular, the first shell wall 26 is provided on the lower shell 21, the second shell wall 27 is provided on the upper shell 11, and the first shell wall 26 and the second shell wall 27 are disposed opposite to each other. For example, the upper case 11 and the lower case 21 are connected together in a snap-fit manner. For example, the upper shell 11 and the lower shell 21 are bonded together by an adhesive.

Figure 4:
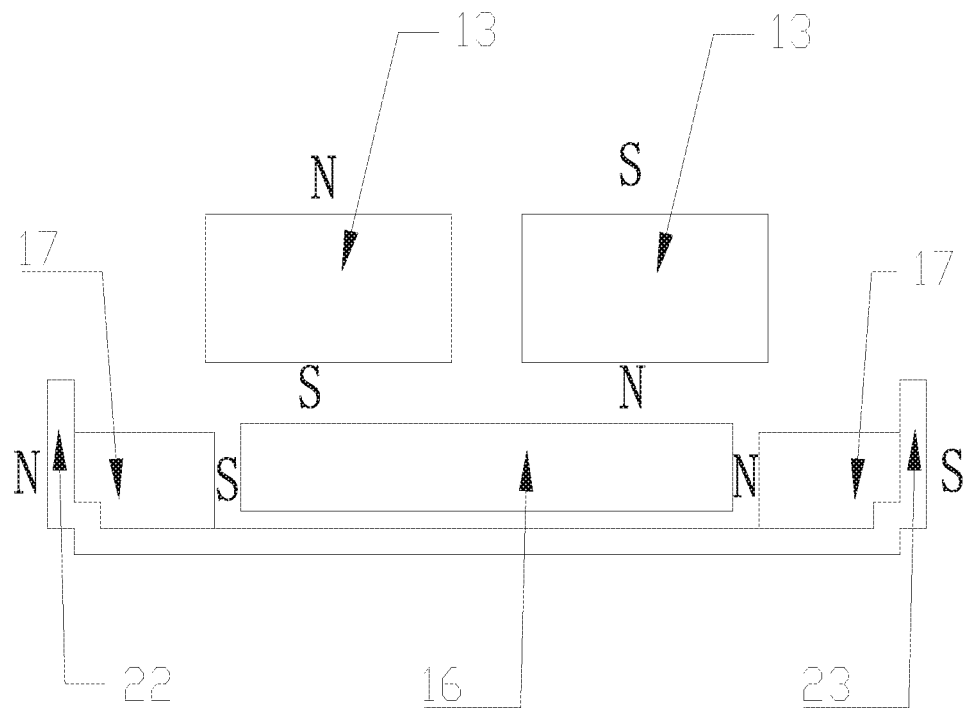
FIG. 4 is a schematic diagram of a linear vibration motor according to an embodiment of the present invention.

In the embodiment, the coil 16 includes long edges and short edges, wherein the long edges are perpendicular to the direction of vibration. The direction of vibration is the direction of vibration of the vibrator assembly. As shown in FIG. 4, since the current directions of the two long edges are opposite, the two permanent magnets opposite to the two long edges have opposite polarities at the initial position, so as to ensure the same direction of the magnetic field forces borne by the two long edges. Preferably, the coil 16 is communicatively connected to an external circuit via an FPCB 18, by means of which stable signal transmission is ensured. Of course, optionally the lead wire of the coil 16 may be directly connected to the external circuit to transmit signals. The vibration amplitude and frequency can be adjusted by controlling the magnitude and the frequency of the current of the coil 16. In order to further increase the driving force, for example, a plurality of coils 16 may be adopted, e.g., a plurality of coils 16 may be arranged in parallel in the direction of vibration. In this example, each coil 16 should have two magnets having opposite polarities for cooperating therewith.

In this embodiment, the counterweight portion may be, but is not limited to, tungsten steel block 14. The permanent magnets may be, but are not limited to ferrite magnets and neodymium iron boron magnets, as long as a uniform magnetic field with predetermined field strength can be formed. In one example, the permanent magnet comprises two intermediate magnets 13 which are located in the middle of the counterweight portion. The magnetizing direction of the two intermediate magnets 13 is perpendicular to the plane where the coil 16 is located and the two intermediate magnets 13 are opposite in polarity. For example, the two intermediate magnets 13 are embedded in the middle of the tungsten steel block 14, which saves spaces and facilitates the designing of a light and thin linear vibration motor. In order to improve the magnetic field strength of the intermediate magnets 13, the vibrator assembly is further provided with a washer 12 which functions in magnetic concentration. The washer 12 can effectively concentrate the magnetic lines so as to make them distributed much more along the predetermined directions. Thus, the magnetic field strength of the intermediate magnets 13 is improved. Preferably, the washer 12 is configured at one side of the vibrator assembly away from the coil 16.

In order to make the vibration of the vibrator assembly more balanced, in a particular embodiment of the invention, the linear vibration motor comprises two resilient elements. The two resilient elements are respectively located on both sides of the central support 19. Specifically, the central support 19 includes a first barrier wall 22 and a second barrier wall 23 disposed opposite to each other in the direction of vibration. For example, the first barrier wall 22 and the second barrier wall 23 may be configured to protrude from the central support 19 or may be embedded into the central support 19, as long as the resilient elements can be connected. The counterweight portion includes a surface close to the central support 19. The counterweight portion further comprises a first side wall 24 and a second side wall 25 which protrude from the surface. The first side wall 24 and the second side wall 25 are disposed opposite to each other in the direction of vibration. The first side wall 24 is connected to the first barrier wall 22 through the resilient element. The second barrier wall 23 is connected to the second side wall 25 by the resilient element. In this way, the first side wall 24, the second side wall 25, the first barrier wall 22 and the second barrier wall 23 are perpendicular to the vibration direction.

There are several ways to arrange the barrier walls and the side walls. For example, the first barrier wall 22 and the second barrier wall 23 are located between the first side wall 24 and the second side wall 25. When the coil 16 is located between the first barrier wall 22 and the second barrier wall 23, the coil 16 can be prevented from contacting with the first side wall 24 and the second side wall 25, and the vibration amplitude of the vibrator assembly is not limited by the distance between the first barrier wall 22 and the second barrier wall 23. For example, the first side wall 24 and the second side wall 25 are located between the first barrier wall 22 and the second barrier wall 23. In this way, the vibration amplitude of the vibrator assembly is limited by the distance between the first barrier wall 22 and the second barrier wall 23. For example, the first barrier wall 22, the first side wall 24, the second barrier wall 23 and the second side wall 25 are arranged alternately. The above-mentioned several arrangements can achieve the effect of reducing polarization.

Optionally, the central support 19 may be configured at the first shell wall 26, the second shell wall 27 or the middle of the two shell walls adjacent to the first and second shell walls 2627, which can achieve the effect of reducing polarization. For example, the central support 19 is arranged through an adhesive or welding.

The resilient element may be a spring or elastic sheet 15. In one example, the elastic sheet 15 includes a first cantilever, a second cantilever, and a bending portion between the first and second cantilevers. The first cantilever, the second cantilever and the bending portion are connected together. The first cantilever is connected to the side wall and the second cantilever is connected to the barrier wall. The elastic sheet 15 has a simple structure for convenient installation.

Figure 5:
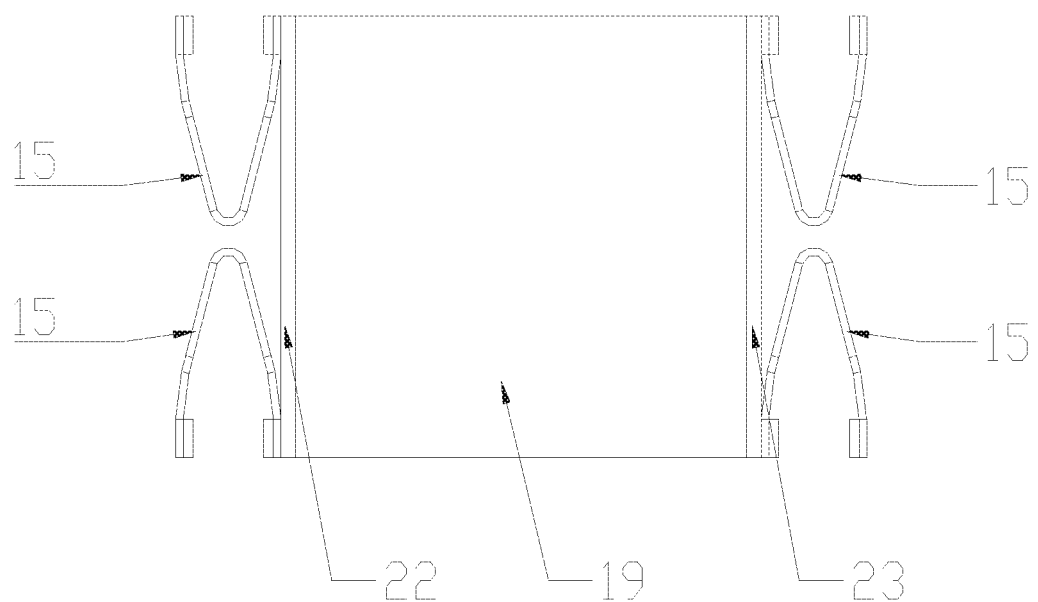
FIG. 5 is an assembled view of the elastic sheet and the central support according to an embodiment of the present invention.

In order to achieve a stable vibration effect, in a specific embodiment of the present invention, as shown in FIG. 5, two elastic sheets 15 are symmetrically arranged between the first side wall 24 and the first barrier wall 22. Another two elastic sheets 15 are symmetrically arranged between the second side wall 25 and the second barrier wall 23. The structure of double elastic sheets 15 makes the vibration of the linear vibration motor smooth and stable, minimizes the polarization in the other directions and greatly reduces the vibration loss. In addition, when such a structure is operated under low-frequency high-vibration conditions, the amplitude of the double elastic sheets 15 is relatively small and no resilient deformation occurs due to polarization, so that the reliability of the elastic sheet 15 is greatly improved.

The spring may be a compression spring or a tension spring. The spring has a characteristic of being in a small volume. But the spring is prone to radial deformation, thereby generating polarization.

Figure 6:
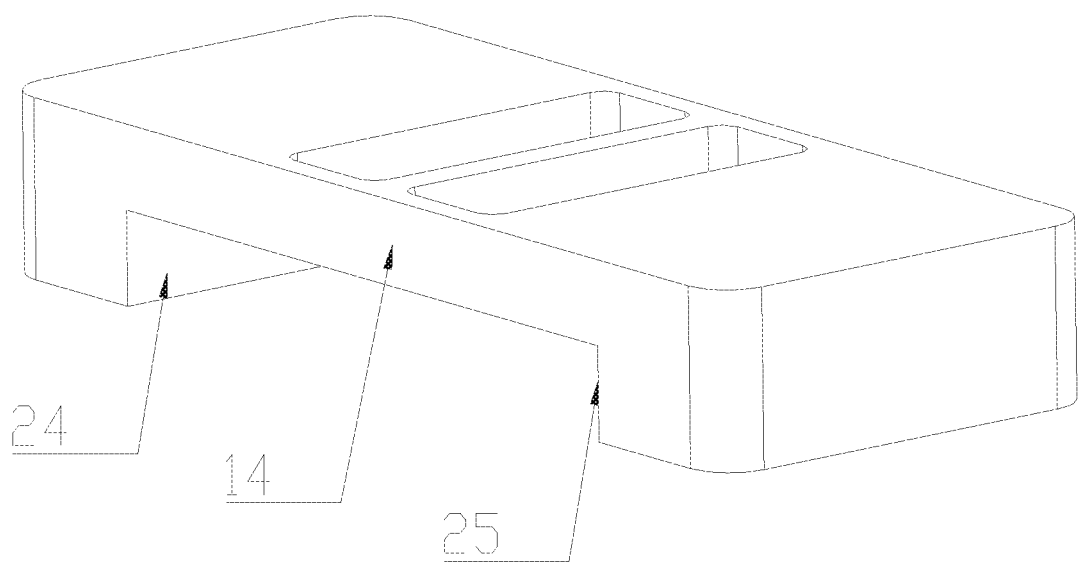
FIG. 6 is a schematic view of the structure of the tungsten steel block according to an embodiment of the present invention.

In order to facilitate the assembling of the central support 19 and the tungsten steel block 14, in a particular embodiment of the invention, the central support 19 is U-shaped as shown in FIGS. 3, 4 and 6. The U-shaped central support 19 includes a first wall 22 and a second wall 23 arranged opposite to each other. The counterweight portion is in an inverted U shape, and includes a first side wall 24 and a second side wall 25 arranged opposite to each other. For example, the U-shaped central support 19 is provided on the first shell wall 26 of the lower shell 21, the coil 16 is fixed between the first barrier wall 22 and the second barrier wall 23, and the FPCB 18 is located between the central support 19 and the coil 16. The central support 19 can be used not only to connect the resilient element, but also to support the coil 16 and FPCB 18, so as to reduce the space occupied by the coil 16 and the FPCB 18 and facilitate the design of the light and thin linear vibration motor. Upon assembling, the tungsten steel block 14 is engaged with the outside of the central support 19. In another example, the coil 16 is arranged on the first shell wall 26 of the lower shell 21, and the central support 19 is arranged on the second shell wall 27 of the upper shell 11, which plays a same role in reducing polarization.

In order to improve the driving force to produce a better vibration effect of the vibrator assembly, in a particular embodiment of the present invention, at the outer sides of the two long edges of the coil 16 are respectively provided with a lateral magnet 17 as shown in FIGS. 1 to 4. The two lateral magnets 17 are configured to be magnetized in the direction of vibration, and the two lateral magnets 17 are opposite in polarity. The polarity of the lateral magnet 17 is the same as the polarity of the adjacent intermediate magnet 13. In one example, the coil 16 and the lateral magnet 17 are disposed within the central support 19 as shown in FIG. 4. For example, both the intermediate magnet 13 and the lateral magnet 17 adjacent to the left long edge of the coil 16 have a polarity of S pole; both the intermediate magnet 13 and the lateral magnet 17 adjacent to the right long edge of the coil 16 a polarity of N pole. This arrangement can enhance the magnetic field strength of the stator portion, so that the vibrator assembly obtains a relatively strong driving force to enable the linear vibration motor to make a quick response upon the low frequency and high vibration. It is preferable that the height of the lateral magnet 17 is smaller than the height of the coil 16. This arrangement can prevent the magnetic field of the lateral magnet 17 and the magnetic field of the intermediate magnet 13 from interfering with each other, and avoid collision between the vibrator assembly and the lateral magnet 17 during vibration.

Of course, it is also possible that both the intermediate magnet 13 and the lateral magnet 17 adjacent to the left long edge of the coil 16 have a polarity of an N pole; and both the intermediate magnet 13 and the lateral magnet 17 adjacent to the right long edge of the coil 16 have a polarity of an S pole.

In addition, for avoiding collision between the vibrator assembly and the shell when falling or suffering a collision, in a specific embodiment of the present invention, resilient pads 20 are provided on the shell and configured to define the vibration range of the vibrator assembly. In one example, the resilient pads 20 are configured within the cavity and located at both sides of the shell wall in the direction of vibration. The material of the resilient pad 20 may be, but is not limited to, plastics, rubber or silicone. These materials can effectively buffer the collision of the vibrator assembly.

While certain specific embodiments of the present invention have been illustrated by way of example, it will be understood by those skilled in the art that the foregoing examples are provided for the purpose of illustration and are not intended to limit the scope of the present invention. It will be understood by those skilled in the art that the foregoing embodiments may be modified without departing from the scope and spirit of the invention. The scope of the present invention is defined by attached claims.

What is claimed is:
1. A linear vibration motor, comprising:
 a stator assembly including a shell, a coil and a central support, wherein the shell is provided with a cavity and includes a shell wall in parallel to a direction of vibration, and the coil and the central support are located in the cavity, the coil being configured on the shell wall and the central support being configured in an intermediate portion of the shell wall to connect a resilient element;
 a vibrator assembly including a permanent magnet and a counterweight portion, the permanent magnet and the counterweight portion being connected together; and
 the resilient elements for providing resilient restoring force, through which the vibrator assembly is suspended within the cavity, wherein the resilient element comprise a first end and a second end arranged opposite to each other in the direction of vibration, the first end being connected to the central support and the second end being connected to the vibrator assembly;
 the central support comprises a first barrier wall and a second barrier wall arranged opposite to each other in the direction of vibration; the counterweight portion includes a surface close to the central support, and further includes a first side wall and a second side wall protruding from the surface respectively, the first side wall and the second side wall being arranged opposite to each other in the direction of vibration, the first side wall being connected to the first barrier wall through the resilient element, and the second barrier wall being connected to the second side wall through the resilient element.

2. The linear vibration motor according to claim 1, wherein the central support is in a U shape and comprises the first barrier wall and the second barrier wall arranged opposite to each other, and the counterweight portion is in an inverted U shape and comprises the first side wall and the second side wall arranged opposite to each other.

3. The linear vibration motor according to claim 1, wherein the coil and the central support are arranged on one same shell wall, and the central support is arranged between the shell wall and the coil.

4. The linear vibration motor according to claim 1, wherein the shell wall comprises a first shell wall and a second shell wall arranged opposite to each other, the coil being arranged on the first shell wall and the central support being arranged on the second shell wall.

5. The linear vibration motor according to claim 1, wherein the first barrier wall and the second barrier wall are located between the first side wall and the second side wall.

6. The linear vibration motor according to claim 1, wherein the resilient element is a spring or an elastic sheet, wherein the elastic sheet comprises a first cantilever, a second cantilever and a bending portion located between the first cantilever and the second cantilever, the first cantilever, the second cantilever and the bending portion being connected together, the first cantilever being connected to the side wall and the second cantilever being connected to the barrier wall.

7. The linear vibration motor according to claim 1, wherein two elastic sheets are symmetrically arranged between the first side wall and the first barrier wall, and another two elastic sheets are symmetrically arranged between the second side wall and the second barrier wall.

8. The linear vibration motor according to claim 1, wherein at outer sides of the two long edges of the coil are respectively arranged one lateral magnet, two lateral magnets being configured to be magnetized in the direction of vibration, both an intermediate magnet and the lateral magnet adjacent to the left long edge of the coil having a polarity of S pole, and both an intermediate magnet and the lateral magnet adjacent to the right long edge of the coil having a polarity of N pole.

9. The linear vibration motor according to claim 8, wherein the lateral magnet has a height less than a height of the coil.

10. The linear vibration motor according to claim 1, wherein: at outer sides of the two long edges of the coil are respectively arranged one lateral magnet, the two lateral magnets being configured to be magnetized in the direction of vibration, both an intermediate magnet and the lateral magnet adjacent to the left long edge of the coil having a polarity of an N pole, and both an intermediate magnet and the lateral magnet adjacent to the right long edge of the coil having a polarity of an S pole.

11. The linear vibration motor according to claim 10, wherein the lateral magnet has a height less than a height of the coil.

* * * * *

UNITED STATES PATENT AND TRADEMARK OFFICE
CERTIFICATE OF CORRECTION

PATENT NO. : 10,536,064 B2
APPLICATION NO. : 15/573258
DATED : January 14, 2020
INVENTOR(S) : Baoyu Liu It is certified that error appears in the above-identified patent and that said Letters Patent is hereby corrected as shown below:

In the Specification

Column 6, Line 20: "2627" should read -- 26, 27 --.

Signed and Sealed this
Twenty-fifth Day of February, 2020

Andrei Iancu
*Director of the United States Patent and Trademark Office*